(12) United States Patent
Oshima

(10) Patent No.: US 9,090,131 B2
(45) Date of Patent: Jul. 28, 2015

(54) PNEUMATIC TIRE

(75) Inventor: Masatomo Oshima, Kodaira (JP)

(73) Assignee: BRIDGESTONE CORPORATION, Tokyo (JP)

(*) Notice: Subject to any disclaimer, the term of this patent is extended or adjusted under 35 U.S.C. 154(b) by 163 days.

(21) Appl. No.: 13/807,894

(22) PCT Filed: Jun. 20, 2011

(86) PCT No.: PCT/JP2011/003505
§ 371 (c)(1),
(2), (4) Date: Mar. 12, 2013

(87) PCT Pub. No.: WO2012/001907
PCT Pub. Date: Jan. 5, 2012

(65) Prior Publication Data
US 2013/0186535 A1 Jul. 25, 2013

(30) Foreign Application Priority Data
Jul. 2, 2010 (JP) ................. 2010-152421

(51) Int. Cl.
*B60C 11/13* (2006.01)
*B60C 11/03* (2006.01)

(52) U.S. Cl.
CPC ............. *B60C 11/03* (2013.01); *B60C 11/0302* (2013.01); *B60C 11/13* (2013.01); *B60C11/1315* (2013.01); *B60C 11/1323* (2013.01); *B60C 2011/0374* (2013.01); *B60C 2011/0383* (2013.01); *B60C 2200/10* (2013.01)

(58) Field of Classification Search
CPC .... B60C 11/03; B60C 11/0302; B60C 11/13; B60C 11/1307; B60C 11/1315; B60C 11/032; B60C 11/033; B60C 11/1323; B60C 11/1353; B60C 2011/03; B60C 2011/0339; B60C 2011/0344; B60C 2011/0346; B60C 2011/0353; B60C 2011/0355; B60C 2011/0374; B60C 2011/0376; B60C 2011/0379; B60C 2011/0381; B60C 2011/0383; B60C 2011/1307; B60C 2011/1353; B60C 2200/10
USPC ................. 152/209.1, 209.9, 209.11, 209.24, 152/209.25, 209.28
See application file for complete search history.

(56) References Cited

U.S. PATENT DOCUMENTS

| | | | |
|---|---|---|---|
| 4,114,671 A * | 9/1978 | Maiocchi et al. | 152/209.21 |
| 6,070,631 A | 6/2000 | Armellin et al. | |
| 7,849,895 B2 * | 12/2010 | Fukunaga | 152/209.15 |
| 2005/0098250 A1 | 5/2005 | Ito | |
| 2005/0211355 A1 | 9/2005 | Metz | |
| 2008/0000564 A1 | 1/2008 | Mukai | |
| 2008/0142133 A1* | 6/2008 | Ochi | 152/209.8 |
| 2010/0175799 A1* | 7/2010 | Takahashi et al. | 152/209.3 |

FOREIGN PATENT DOCUMENTS

| | | | |
|---|---|---|---|
| JP | 4-321404 A | | 11/1992 |
| JP | 6-115316 A | | 4/1994 |
| JP | 8-188016 A | | 7/1996 |
| JP | 200688938 A | | 4/2006 |
| JP | 2007-112218 A | | 5/2007 |
| JP | 2007-223453 A | | 9/2007 |
| JP | 2008-6987 | | 1/2008 |
| JP | 2010260471 A | | 11/2010 |
| WO | 2010/073279 A1 | | 7/2010 |
| WO | WO 2011/059008 | * | 5/2011 |

OTHER PUBLICATIONS

JP 2007-112218, May 2007, English language machine translation, http://www4.ipdl.inpitgo.jp/Tokujitu/PAJdetail.ipdl?N0000=60&N0120=01&N2001=2&N3001=2007-112218.*
Extended European Search Report, dated Jul. 22, 2014, issued in European Patent Application No. 11800380.5.
International Search Report for PCT/JP2011/003505 dated Jul. 12, 2011.
Chinese Office Action issued in Chinese Application No. 201180041828.6 dated Nov. 3, 2014 English translation.
Communication from United States Patent and Trademark Office issued Apr. 1, 2015 in related U.S. Appl. No. 14/542,833.

Communication dated Mar. 31, 2015 from the Japanese Patent Office in counterpart application No. 2012-522446.

* cited by examiner

*Primary Examiner* — Eric Hug
(74) *Attorney, Agent, or Firm* — Sughrue Mion, PLLC

(57) ABSTRACT

The present invention has an object of providing a pneumatic tire having a tread pattern capable of providing both excellent drivability and a high partial wear resistance. The pneumatic tire of the present invention includes, in a tread surface, a compound groove partitioned into a first groove portion and a second groove portion by a first groove side and a second groove side, the first groove side having an oblique side portion diagonally disposed relative to a tire circumferential line in plan view, the second groove side intersecting with the oblique side portion of the first groove side at an acute angle in plan view, in which: the first groove portion and the second groove portion both have a groove depth that gradually reduces in an extending direction of the groove toward an intersection between the oblique side portion and the second groove side; and a groove wall extending from the first groove side is formed as a tapered surface mildly-sloped toward a groove bottom on the intersection side when viewed in the groove transverse direction. Further, the pneumatic tire of the present invention includes, in a tread surface, a groove partitioned by at least three groove sides in plan view, in which: one or more of groove walls extending from one of the at least three groove sides that extends in the longitudinal direction of the groove is formed as a tapered surface at least in part thereof; and the tapered surface forms an angle with a plane perpendicular to the tread surface, which varies in the extending direction of the groove side.

6 Claims, 4 Drawing Sheets

(a)

(b)

(c)

(d)

(e)

PNEUMATIC TIRE

CROSS REFERENCE TO RELATED APPLICATIONS

This application is a National Stage of International Application No. PCT/JP2011/003505, filed on Jun. 20, 2011, which claims priority from Japanese Patent Application No. 2010-152421, filed on Jul. 2, 2010, the contents of all of which are incorporated herein by reference in their entirety.

TECHNICAL FIELD

The present invention relates to a pneumatic tire, and more particularly to a pneumatic tire suitably used as a pneumatic tire for a motorcycle.

BACKGROUND ART

In general, a pneumatic tire, in particular, a pneumatic tire for a motorcycle is known to be largely affected, in terms of drivability, by the shape of grooves (tread pattern) formed in a tread surface of a tread portion.

As an example of a conventional pneumatic tire for a motorcycle, there has been proposed a pneumatic tire for a motorcycle having a circumferential groove extending substantially in the tire circumferential direction and a plurality of lateral grooves extending substantially in the tire width direction, the grooves being formed in a tread surface of the tire (see, for example, Patent Literatures 1, 2). In the aforementioned pneumatic tire for a motorcycle, the circumferential groove functions to improve drivability and to prevent skidding while the lateral grooves exert drive force and braking force.

However, the grooves formed in a tread surface of the tread portion, which may improve the drivability or the like, also reduces the rigidity of the tread portion to generate a difference in rigidity. As a result, a pneumatic tire for a motorcycle having a circumferential groove and a lateral groove formed in a tread surface of a tread portion for the purpose of ensuring drivability can be subjected to significant partial wear, and thus it has been difficult to ensure both drivability and partial wear resistance at the same time.

CITATION LIST

Patent Literature

PTL 1: JP H04-321404 A
PTL 2: JP H06-115316 A

SUMMARY OF INVENTION

Technical Problem

In view of the above, there has been a demand for a pneumatic tire having a tread pattern capable of ensuring both excellent drivability and high partial wear resistance at the same time.

Solution to Problem

The present invention has an object to advantageously solve the aforementioned problems, and a pneumatic tire of the present invention has a feature of including, in a tread surface, a compound groove partitioned into a first groove portion and a second groove portion by a first groove side and a second groove side, the first groove side having an oblique side portion diagonally disposed relative to a tire circumferential line in plan view, the second groove side intersecting with the oblique side portion of the first groove side at an acute angle in plan view, in which the first groove portion and the second groove portion both have a groove depth that gradually reduces in an extending direction of the groove toward an intersection between the oblique side portion and the second groove side, and a groove wall extending from the first groove side is formed as a tapered surface mildly-sloped toward a groove bottom on the intersection side when viewed in a groove transverse direction. As described above, the groove depth is made smaller on the intersection side in the groove extending direction while a tapered surface is formed on the intersection side in the groove transverse direction, to thereby suppress generation of partial wear and reduction in rigidity, particularly in the vicinity of the oblique side portion. Therefore, a high partial wear resistance can be obtained while providing excellent drivability.

Here, the "compound groove partitioned into a first groove portion and a second groove portion by a first groove side and a second groove side" in the present invention may include, without impairing the effect of the invention, a compound groove partitioned into the first groove portion and the second groove portion that are slightly spaced apart from each other due to manufacturing reasons. That is, the first groove side and the second groove side may not be technically connected at the intersection, whereas a virtual line connecting the disconnected first groove sides and a virtual line connecting the disconnected second groove sides still intersect with each other to form the intersection. Further, the "groove extending direction" refers to an extending direction, in plan view, of a line passing through the center of the compound groove width measured in a direction perpendicular to the oblique side portion and the extension thereof, and the "groove transverse direction" refers to a direction, in plan view, perpendicular to the oblique side portion and the extension thereof.

Here, in the pneumatic tire of the present invention, the oblique side portion is preferably shorter in length than the second groove side. The oblique side portion shorter in length than the second groove side allows the tapered surface to extend across the most part of the first groove portion and second groove portion, which further improves the pneumatic tire in partial wear resistance.

Further, in the pneumatic tire of the present invention, the tapered surface forms an angle with a plane perpendicular to the tread surface, the angle preferably falling within a range of 20° to 75° measured from the acute-angle side. The tapered surface needs to form an angle of at least 20° with a plane perpendicular to the tread surface in order to sufficiently suppressing reduction in rigidity in the vicinity of the oblique side portion to thereby improve partial wear resistance. On the other hand, the angle needs to be 75° at maximum in order to ensure drainage, and also to avoid unnecessarily increasing the groove area required for forming the tapered surface, to thereby suppress reduction in rigidity. It should be noted that, in the present invention, "the tapered surface forms an angle with a plane perpendicular to the tread surface", which means that the tapered surface forms an angle with a virtual plane passing through the oblique side portion in a direction perpendicular to the tread surface.

In addition, in the pneumatic tire of the present invention, the oblique side portion forms an inclination angle relative to the tire circumferential line, the inclination angle preferably falling within a range of 15° to 85° measured from the acute-angle side. The inclination angle less than 15° may fail to ensure sufficient rigidity in the tire circumferential direction in the vicinity of the oblique side portion. On the other hand, the inclination angle over 85° may fail to ensure sufficient rigidity in the tire width direction in the vicinity of the oblique side portion.

Then, in the pneumatic tire of the present invention, the first groove portion and the second groove portion both preferably have a groove wall extending from the second groove side, the groove wall forming an angle with a plane perpendicular to the tread surface, which preferably varies in an extending direction of the second groove side. The angle of a groove wall extending from the second groove side may be adapted to change, so as to obtain a high partial wear resistance and excellent drivability, while providing excellent turning performance. It should be noted that, in the present invention, the "groove wall extending from the second groove side forms an angle with a plane perpendicular to the tread surface", which means that the groove wall extending from the second groove side forms an angle with a virtual plane passing through the second groove side in a direction perpendicular to the tread surface. Further, the "virtual plane passing through the second groove side" refers to a virtual plane passing through a tangent of the second groove side when the second groove side is a curved line.

The present invention has an object to advantageously solve the aforementioned problems, and a pneumatic tire of the present invention has a feature of including, in a tread surface, a groove partitioned by at least three groove sides in plan view, in which the groove sides extending in a longitudinal direction of the groove have groove walls extending toward a groove bottom, one or more of the groove walls being formed as tapered surfaces at least in part thereof; and in which the tapered surfaces each form an angle with a plane perpendicular to the tread surface, which varies in an extending direction of the groove side.

It should be noted that, in the present invention, "the tapered surface forms an angle with a plane perpendicular to the tread surface", which means that the tapered surface forms an angle with a virtual plane which is perpendicular to the tread portion as passing through a groove side extending in a longitudinal direction of the groove. Further, the "virtual plane passing through a groove side" refers to a virtual plane passing through a tangent of the groove side when the groove side is a curved line. In addition, the "angle which varies in an extending direction of the groove side" may refer not only to an angle which varies continuously but also to an angle which varies intermittently.

Then, the pneumatic tire of the present invention preferably includes at least one groove wall formed of a mildly-sloped surface that intersects with the tapered surface within the groove.

Advantageous Effect of Invention

According to the present invention, there can be provided a pneumatic tire capable of ensuring both excellent drivability and a high partial wear resistance.

BRIEF DESCRIPTION OF DRAWINGS

The present invention will be further described below with reference to the accompanying drawings, wherein:

FIG. 4 are explanatory views each for illustrating forces to be applied to the pneumatic tire of FIG. 1 when rolled under load, in which: FIG. 4(a) illustrates the pneumatic tire of FIG. 1 mounted onto a front wheel of a motorcycle; and FIG. 4(b) illustrates the pneumatic tire of FIG. 1 mounted onto a rear wheel of a motorcycle.

DESCRIPTION OF EMBODIMENTS

Figure 1:
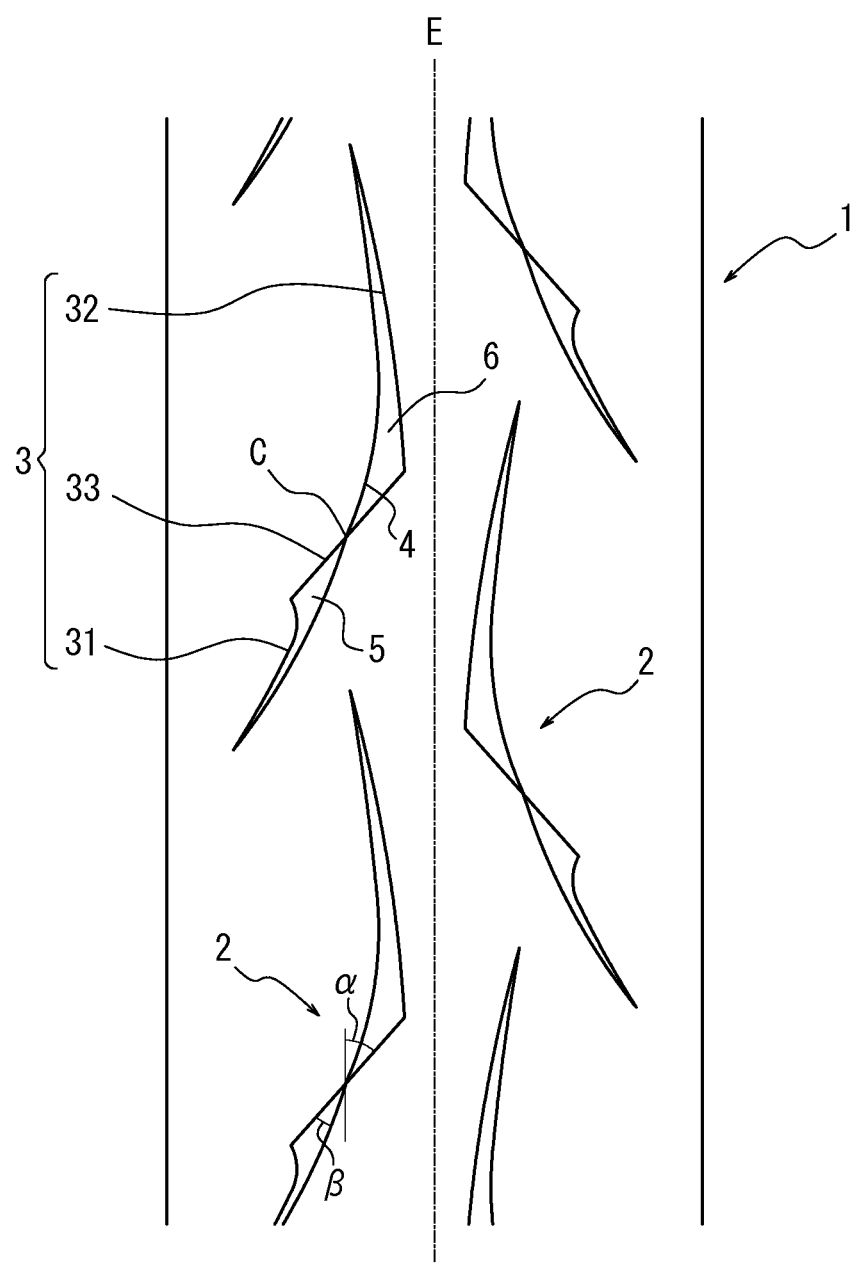
FIG. 1 is a development view illustrating part of a tread portion of a representative example of a pneumatic tire according to the present invention.

Hereinafter, embodiments of the present invention will be described in detail with reference to the drawings. Here, FIG. 1 is a development view illustrating part of a tread portion of an example of a pneumatic tire according to the present invention. The pneumatic tire of FIG. 1, which illustrates the tread portion thereof in part, is a pneumatic tire for a motorcycle, and more specifically, a pneumatic tire for a motorcycle designed for racing. The pneumatic tire for a motorcycle has a plurality of compound grooves 2 formed in a tread surface 1 thereof, the grooves 2 each terminating within the tread surface 1. Specifically, this exemplary pneumatic tire has a plurality of compound grooves 2 in the same shape formed in the tread surface 1 thereof, the compound grooves 2 being dimensionally arranged as being oriented opposite to each other (line symmetry) across a tire equator E while being displaced by half a pitch from each other in the tire circumferential direction.

Figure 2:
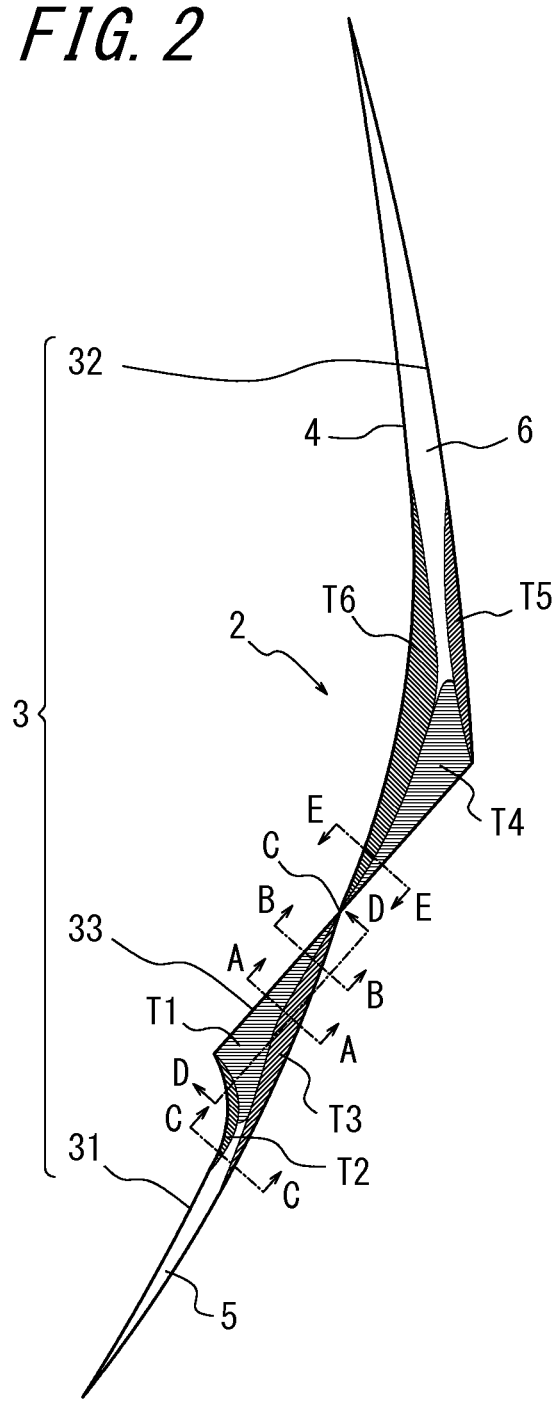
FIG. 2 is an enlarged view illustrating in magnification one compound groove formed in a tread portion of the pneumatic tire of FIG. 1.

Here, as illustrated in FIGS. 1 and 2, the compound grooves 2 are each partitioned into a first groove portion 5 and a second groove portion 6 by a first groove side 3 and a second groove side 4, the first groove portion 5 and the second groove portion 6 being substantially triangular in shape. In other words, the compound grooves 2 each include a pair of groove portions (the first groove portion 5 and the second groove portion 6).

The first groove side 3 bends twice to extend substantially in the tire circumference direction. Specifically, the first groove side 3 includes: a first side portion 31 extending from one end (lower side of FIGS. 1 and 2) in the tire circumference direction of the compound groove 2; a second side portion 32 extending from the other end (upper side in FIGS. 1 and 2) in the tire circumferential direction; and an oblique side portion 33 connecting the first side portion 31 and the second side portion 32 on the center side of the compound groove 2 in the tire circumferential direction while being obliquely disposed at an inclination angle of α relative to a tire circumferential line parallel to the tire equator E.

Further, the second groove side 4 is a curved line extending substantially in the tire circumferential direction as being convexed to the tire equator E side. Then, the second groove side 4 intersects, at an intersection C, with the oblique side portion 33 of the first groove side 3 at an angle β or (0°<β<90°). Here, in this exemplary pneumatic tire, the second groove side 4 is a curved line, and therefore, the intersection angle β between the oblique side portion 33 and the second groove side 4 refers to an angle between the oblique side portion 33 and a tangent of the second groove side 4 at the intersection C.

The first groove portion 5 is, as illustrated in FIGS. 1 and 2, a portion which is substantially triangular in shape in plan view enclosed by the first side portion 31, part of the oblique side portion 33, and part of the second groove side 4.

Then, in the first groove portion 5, the groove walls are each formed in part as a mildly-sloped tapered surface. Specifically, in the first groove portion 5, part of a groove wall extending from the first side portion 31 of the first groove side 3 toward the groove bottom, a groove wall extending from the oblique side portion 33 toward the groove bottom, and part of a groove wall extending from the second groove side 4 toward the groove bottom each are configured as mildly-sloped tapered surfaces T1 to T3, respectively, each being in a shape indicated with hatched lines in FIG. 2 in plan view.

Figure 3:
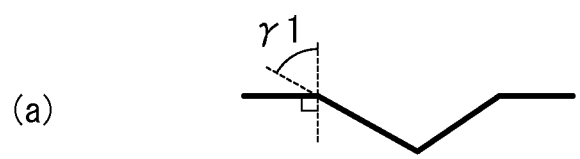
FIGS. 3(a) to 3(e) are sectional views each taken along the lines A-A to E-E, respectively, of FIG. 2.
Figure 3:
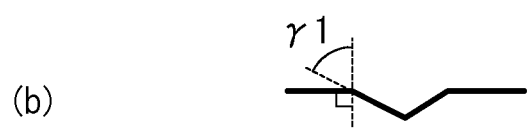
Figure 3:
Figure 3:
Figure 3:
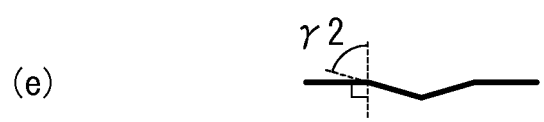

Specifically, in the first groove portion 5, as illustrated in sections in FIGS. 3(a) and 3(b) which are taken along the lines A-A and B-B of FIG. 2, respectively, a groove wall extending from the oblique side portion 33 on the intersection C side of the first groove side 3 when viewed in a groove transverse direction (direction perpendicular to the oblique side portion 33 and to an extension thereof) toward a groove bottom is formed as the mildly-sloped tapered surface T1 which forms an angle γ1 (on the acute angle side) with a plane passing through the oblique side portion 33 in a direction perpendicular to the tread surface 1. Further, in the first groove portion 5, as illustrated in sections in FIGS. 3(c) and 3(d) which are taken along the lines C-C and D-D of FIG. 2, respectively, part of a groove wall extending from the first side portion 31 of the first groove side 3 toward the groove bottom is formed as the mildly-sloped tapered surface T2, and part of a groove wall extending from the second groove side 4 toward the groove bottom is formed as the mildly-sloped tapered surface T3. Therefore, the first groove portion 5 has a groove depth, as illustrated in FIGS. 3(a) to 3(c), which gradually decreases in a groove extending direction (extending direction of a line passing through the center of a groove width measured in a direction perpendicular to the oblique side portion 33 and the extension thereof) toward the intersection C.

Here, as is apparent from FIGS. 2 and 3(a) to 3(c), the tapered surface T3, which is part of the groove wall extending from the second groove side 4 of the first groove portion 5 toward the groove bottom, forms an angle with a plane perpendicular to the tread surface, which varies in the extending direction of the second groove side 4. Specifically, when viewed in section in a direction perpendicular to the extending direction of the second groove side 4, the angle formed between the tapered surface T3 and the tread surface becomes larger on the intersection C side. Further, the tapered surface T2, which is part of a groove wall extending from the first side portion 31 of the first groove side 3 toward the groove bottom, also forms an angle with a plane perpendicular to the tread surface which changes in the extending direction of the first side portion 31. Specifically, when viewed in section in a direction perpendicular to the extending direction of the first side portion 31, the angle formed between the tapered surface T2 and the tread surface becomes larger on the oblique side portion 33 side.

The second groove portion 6 is, as illustrated in FIGS. 1 and 2, a portion which is substantially triangular in shape in plan view enclosed by the second side portion 32, part of the oblique side portion 33, and part of the second groove side 4.

Then, in the second groove portion 6, as in the first groove portion 5, the groove walls are formed in part as mildly-sloped tapered surfaces. Specifically, in the second groove portion 6, part of a groove wall extending from the second side portion 32 of the first groove side 3 toward the groove bottom, a groove wall extending from the oblique side portion 33 toward the groove bottom, and part of a groove wall extending from the second groove side 4 toward the groove bottom each are configured as mildly-sloped tapered surfaces T4 to T6, respectively, each being in a shape as indicated with hatched lines in FIG. 2 in plan view.

Specifically, in the second groove portion 6, as illustrated in sections in FIG. 3(e) which is taken along the line E-E of FIG. 2, a groove wall extending from the oblique side portion 33 on the intersection C side of the first groove side 3 when viewed in a groove transverse direction (direction perpendicular to the oblique side portion 33 and to an extension thereof) toward a groove bottom is formed as the mildly-sloped tapered surface T4 which forms an angle γ2 (on the acute angle side) with a plane passing through the oblique side portion 33 in a direction perpendicular to the tread surface 1. Further, in the second groove portion 6, as in the first groove portion 5, part of a groove wall extending from the second side portion 32 of the first groove side 3 toward the groove bottom is formed as the mildly-sloped tapered surface T5, and a groove wall extending from the second groove side 4 toward the groove bottom is formed in part as the mildly-sloped tapered surface T6. Therefore, the second groove portion 6 has, similarly to the first groove portion 5, a groove depth which gradually decreases toward the intersection C when viewed in a groove extending direction (extending direction of a line passing through the center of a groove width measured in a direction perpendicular to the oblique side portion 33 and the extension thereof).

Here, the tapered surface T6, which is part of the groove wall extending from the second groove side 4 of the second groove portion 6 toward the groove bottom, forms an angle with a plane perpendicular to the tread surface, which varies in the extending direction of the second groove side 4. Specifically, when viewed in section in a direction perpendicular to the extending direction of the second groove side 4, the angle formed between the tapered surface T6 and the tread surface becomes larger on the intersection C side. Further, the tapered surface T5, which is part of a groove wall extending from the second side portion 32 of the first groove side 3 toward the groove bottom, also forms an angle with a plane perpendicular to the tread surface which changes in the extending direction of the second side portion 32. Specifically, when viewed in section in a direction perpendicular to the extending direction of the second side portion 32, the angle formed between the tapered surface T5 and the tread surface becomes larger on the oblique side portion 33 side.

Meanwhile, a motorcycle generally has a feature in that it makes a turn by banking the body thereof. Accordingly, a tire mounted on a motorcycle comes into contact in different parts thereof with a road surface, depending on the bank (camber angle) of the body. Further, the tire mounted on a motorcycle is subject to a large lateral force such as camber thrust when the body is banked, in addition to forces to be applied in an anteroposterior direction (tire circumferential direction) such as a braking force and a driving force.

Figure 4:
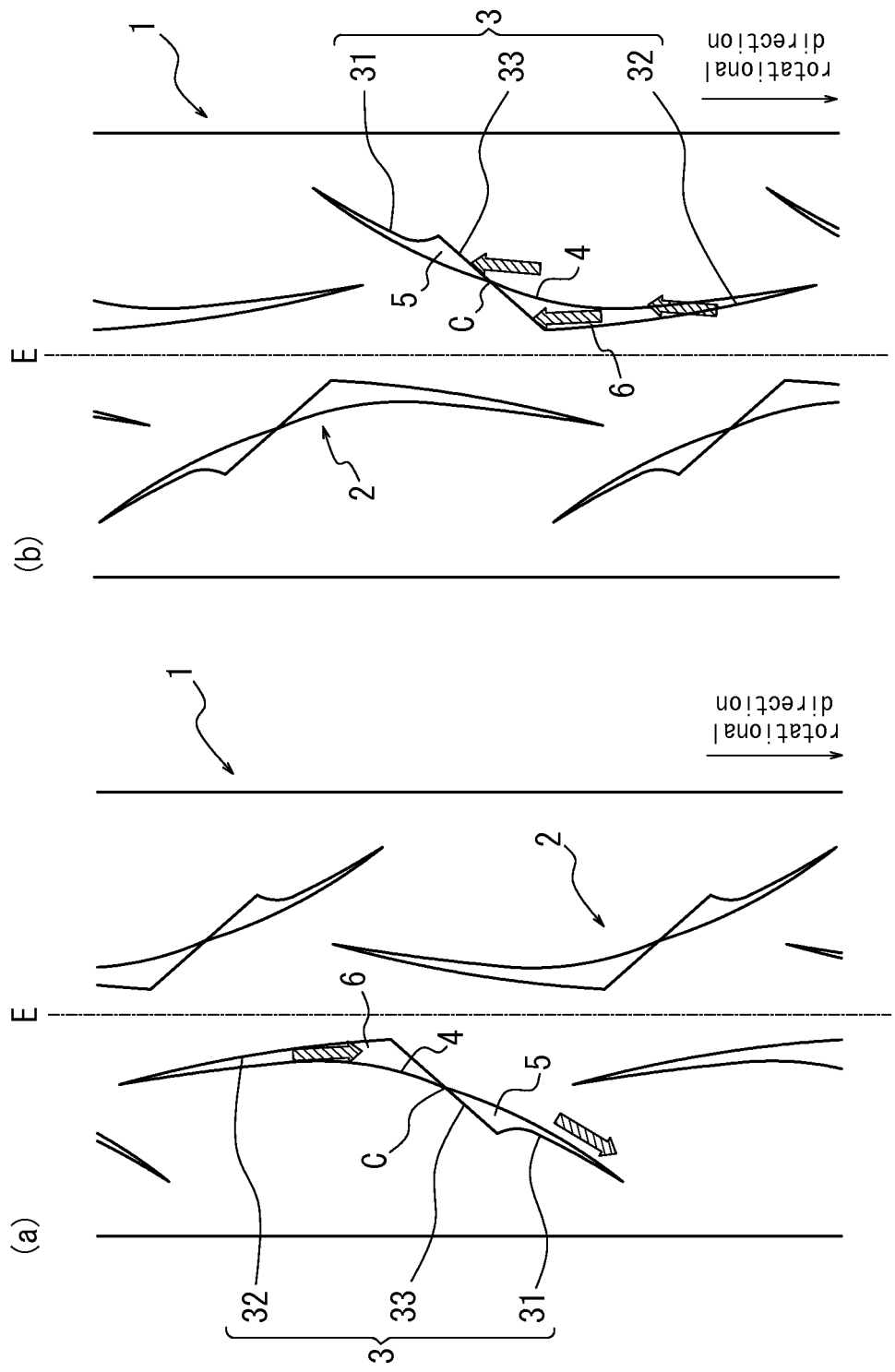

Therefore, when the pneumatic tire of the present invention is applied to a front wheel and a rear wheel of a motorcycle, for example, the front wheel is subject to forces in directions indicated by the arrows of FIG. 4(a) while the rear wheel is subject to forces in directions indicated by the arrows of FIG. 4(b). Here, the forces are input in different directions between the front wheel and the rear wheel of a motorcycle, and thus, in applying the pneumatic tire of the present invention, the tires are mounted in opposite directions between the front wheel and the rear wheel, as illustrated in FIGS. 4(a) and 4(b).

Then, as described above, the first groove portion 5 and the second groove portion 6 of the pneumatic tire each have a groove depth gradually decreases in the groove extending direction toward the intersection C. Further, the groove wall extending from the first groove side 3 is formed as the tapered surfaces T1, T4 that are mildly-sloped toward the groove bottom on the intersection side C when viewed in the groove transverse direction. Therefore, when the tire mounted onto the front wheel is subjected forces input in directions of the arrows of FIG. 4(a), the tapered surface T4 on the second groove portion 6 side receives the forces by the inclined tapered surface, to thereby suppress generation of partial wear. Further, the tapered surface T1 lying on the first groove portion 5 side supports the tread portion so as to prevent the tread portion from yielding, to thereby improve drivability. In addition, when the tire mounted onto the rear wheel is subjected forces input in directions of the arrows of FIG. 4(*b*), the tapered surface T4 on the second groove portion 6 side receives the forces by the inclined tapered surface, similarly to the tire mounted on the front wheel, to thereby suppress generation of partial wear. Further, the tapered surface T1 lying on the first groove portion 5 side supports the tread portion so as to prevent the tread portion from yielding, to thereby improve drivability. Here, in the pneumatic tire of this example, the groove has a depth that gradually reduces in the groove extending direction toward the intersection C, and hence the rigidity in the vicinity of the intersection C is unlikely to be reduced despite that the first groove portion 5 and the second groove portion 6 are arranged close to each other.

Meanwhile, in the pneumatic tire of this example, the tapered surfaces T1 to T6 extending toward the groove bottom form three-dimensional spatial structures inside the grooves, which also provides excellent appearance.

Here, in the aforementioned example of the pneumatic tire of the present invention, the second groove side 4 is longer in length than the oblique side portion 33, and thus the tapered surfaces T1, T4 extend lengthwise in the groove extending direction. Accordingly, the angles γ1, γ2 formed by each of the tapered surfaces T1, T4, respectively, relative to the tread surface 1 can be ensured large. Here, the angles γ1, γ2 each may preferably be at least 20° in view of suppressing reduction in rigidity in the vicinity of the oblique side portion 33 sufficient enough to improve partial wear resistance. Further, the angles γ1, γ2 each may be preferably 75° or smaller in view of obtaining a predetermined groove depth to ensure drainage while securing a groove area necessary to arrange a mildly-sloped tapered surface with suppressing a reduction in the rigidity. The angles γ1 and γ2 may be either the same or different from each other.

Further, in the aforementioned example of the pneumatic tire of the present invention, in the first groove portion 5 and in the second groove portion 6, the groove wall extending from the second groove side 4 forms a larger angle with a plane perpendicular to the tread surface on the intersection C side. Therefore, high partial wear resistance and excellent drivability can be obtained while ensuring excellent turning performance in making a turn at a particularly small camber angle. Further, the rigidity distribution of the tread portion can be optimized to obtain excellent traction performance and braking performance.

In the pneumatic tire of the present invention, the oblique side portion 33 may preferably be disposed at an inclination angle α of at least 15° relative to the tire circumferential line in view of ensuring sufficient rigidity in the tire circumferential direction in the vicinity of the oblique line portion 33. Meanwhile, the inclination angle α may preferably be 85° at maximum in view of ensuring sufficient rigidity in the tire width direction in the vicinity of the oblique side portion 33.

Further, in the pneumatic tire of the present invention, the intersection angle β between the oblique side portion 33 and the second groove side 4 may preferably be at least 5° in view of providing tapered surfaces with sufficient area inside the first groove portion 5 and the second groove portion 6. On the other hand, the intersection angle β may preferably be 45° at maximum, in view of suppressing the arrangement area of the compound grooves from being increased excessively, which otherwise deteriorates the rigidity.

The pneumatic tire of the present invention is not limited to the aforementioned example, but can be subjected to modifications as appropriate. Specifically, in the pneumatic tire of the present invention, the inclination angle α can be varied to change the extending direction of the compound groove 2, and alternatively, the first groove portion 5 and the second groove portion 6 each may be configured in an arbitrary shape in plan view, and the tapered surfaces T1, T4 each may be configured in an arbitrary shape in plan view. In addition, in the pneumatic tire of the present invention, the compound grooves 2 may be formed only in part of the tread surface 1. Alternatively, the compound grooves 2 may be formed in combination with other well-known tread patterns. Still alternatively, in the aforementioned pneumatic tire, the tapered surfaces T2, T3, T5, and T6 may be dispensable. Then, the pneumatic tire of the present invention can be mounted to only one of the front wheel and the rear wheel of an automobile.

In the aforementioned pneumatic tire, a compound groove including a first groove portion and a second groove portion each being in a predetermined shape is formed in a tread surface to thereby provide both excellent drivability and high wear resistance. However, the pneumatic tire of the present invention may also be improved traction performance and braking performance in the following manner.

Specifically, the present invention may provide a pneumatic tire having a groove formed in the tread surface, the groove being defined by at least three groove sides in plan view, in which one or more of groove walls extending toward the groove bottom from a groove side extending in the longitudinal direction of the groove is formed, at least in part thereof, as a tapered surface that forms an angle with a plane perpendicular to the tread surface, the angle changing in the extending direction of the groove sides.

Here, a pneumatic tire with the aforementioned configuration is not specifically limited, and examples thereof may include a pneumatic tire having at least one of the first groove portion 5 and the second groove portion 6 of the pneumatic tire of FIG. 1

Specifically, an example of the pneumatic tire with the aforementioned configuration may include a tire having a groove (closed groove) enclosed by a first groove side (corresponding to the first side portion 31 of FIG. 1) extending substantially in the tire circumferential direction, a second groove side (corresponding to a part of the oblique side portion 33 of FIG. 1, the part lying on the first side portion 31 side relative to the intersection C) obliquely disposed at an inclination angle α relative to the tire circumferential line parallel to the tire equator E, and a third groove side (corresponding to a part of the second groove side 4 of FIG. 1, the part lying on the first side portion 31 side relative to the intersection C) formed of a curved line extending substantially in the tire circumferential direction while being convexed to the tire equator E side. That is, an example of the pneumatic tire with the aforementioned configuration may include a tire which has only the first groove portion 5 of the pneumatic tire of FIG. 1 formed therein (in other words, a tire without having the second groove portion 6 formed therein).

The groove of this exemplary pneumatic tire is formed, as described above, as being defined by the first groove side, the second groove side, and the third groove side which are extending in different directions from one another, and the groove thus formed is substantially triangular in shape in plan view. Then, the first groove side and the third groove side of the groove both are longer than the second groove side.

Further, the third groove side intersects with the second groove side at an angle β or (0°<β<90°) at an intersection with the second groove side. Here, in this exemplary pneumatic tire, the third groove side is a curved line, and therefore, the intersection angle β between the second groove side and the third groove side refers to an angle between the second groove side and a tangent of the third groove side at the intersection.

Then, in the groove of the exemplary pneumatic tire, the groove walls are each formed in part as a tapered surface. Specifically, part of a groove wall extending toward the groove bottom from the first groove side extending in the longitudinal direction of the groove (groove wall lying on the part of the second groove side), a groove wall extending from the second groove side toward the groove bottom, and part of a groove wall extending toward the groove bottom from the third groove side extending in the longitudinal direction of the groove (groove wall lying on the part of the second groove side) are each configured, similarly to the groove walls of the first groove portion of the pneumatic tire of FIGS. 1 to 3, as a tapered surface.

That is, in this groove, the groove wall extending from the second groove side toward the groove bottom is formed as a mildly-sloped tapered surface (gentle slope) which forms, along the extending direction of the second groove side, a constant angle relative to a plane passing through the second groove side in a direction perpendicular to the tread surface 1.

Further, the groove wall extending from the first groove side toward the groove bottom is formed in part as a tapered surface that forms an angle with a plane perpendicular to the tread surface, the angle changing in the extending direction of the first groove side. In addition, the groove wall extending from the third groove side toward the groove bottom is formed in part as a tapered surface that forms an angle with a plane perpendicular to the tread surface, the angle changing in the extending direction of the third groove side.

Specifically, when viewed in section in a direction perpendicular to the extending direction of each groove side, the tapered surface as part of the groove wall extending from the first groove side toward the groove bottom and the tapered surface as part of the groove wall extending from the third groove side toward the groove bottom each form an angle with the tread surface, the angle being larger on the intersection side with the second groove side.

In addition, the tapered surface as part of the groove wall extending from the first groove side toward the groove bottom and the tapered surface as part of the groove wall extending from the third groove side toward the groove bottom each intersect with a mildly-sloped tapered surface (gentle slope) serving as a groove wall extending from the second groove side toward the groove bottom. In other words, the tapered surfaces form a three-dimensional spatial structure in the groove.

Therefore, this groove has a groove depth which gradually decreases in a groove extending direction (extending direction of a line passing through the center of a groove width measured in a direction perpendicular to the second groove side and the extension thereof) toward the intersection between the second groove side and the third groove side.

Then, the pneumatic tire provided with the groove configured as described above is capable of optimizing the rigidity distribution of the tread portion, to thereby provide excellent traction performance and braking performance particularly in recovery to upright position from cornering. The tire is also capable of ensuring excellent turning performance in making a turn at a small camber angle.

Specifically, in this pneumatic tire, the groove wall on the narrower width side of the groove (opposite to the side of the second groove side in the longitudinal direction of the groove) where land portion rigidity is easy to ensure forms a small angle with the tread surface (the gradient of the groove wall is made steep) in order to ensure the groove volume. On the other hand, the groove wall on the wider width side of the groove (on the part of the second groove side) where land portion rigidity is difficult to ensure forms a large angle with the tread surface (the gradient of the groove wall is made gentle) in order to ensure the land portion rigidity, because even a smaller groove depth can ensure the groove volume. Therefore, the pneumatic tire of this example is capable of optimizing (uniformizing) the land portion rigidity of the tread portion, to thereby provide excellent traction performance, braking performance and turning performance, as compared to the case where the inclination angle of the groove wall extending from the first groove side and the inclination angle of the groove wall extending from the third groove side are constant in extending direction of the groove side. Further, drivability and wear resistance can also be improved. In addition, this pneumatic tire is capable of securing the groove volume as compared to the case where the inclination angle of the groove wall extending from the first groove side and the inclination angle of the groove wall extending from the third groove side are both constant in the extending direction of the groove sides, to thereby suppress deterioration in drainage.

The pneumatic tire of the present invention is not limited to the aforementioned example, but can be subjected to modifications as appropriate. Specifically, the pneumatic tire of the present invention may include only the tapered surface extending from the third groove side. As other examples of the pneumatic tire of the present invention, for example, the pneumatic tire of FIGS. 1 to 3 may be modified to include only the tapered surfaces T3 and T6 formed in the compound groove or to include only the tapered surfaces T2 and T5 formed in the compound groove. In addition, in the pneumatic tire of the present invention, an angle (inclination angle of the groove wall) formed between the groove wall extending from the second groove side and a plane perpendicular to the tread surface may be varied in the extending direction of the second groove side. However, in view of ensuring excellent traction performance, braking performance, and turning performance while reducing workload required for forming the groove, the angle between the groove wall extending from the second groove side and a plane perpendicular to the tread surface may preferably be the same in the extending direction of the second groove side.

EXAMPLES

In the following, the present invention is described in further detail with reference to Examples. However, the present invention is no way limited to the following Examples.

Example 1

Pneumatic tires (for rear wheels) which were configured as illustrated in FIGS. 1 to 4 and had the specifications shown in Table 1 were manufactured as samples by a conventional method. The tires were each in size 180/55ZR17.

Then, the tires were subjected to performance evaluation according to the following methods. The evaluation results are shown in Table 1.

Comparative Example 1

A pneumatic tire having a configuration similar to that of Example 1, except in that the angle formed between the plane perpendicular to the tread surface and the groove wall was 0° and the tapered surfaces T1 to T6 were not provided, was manufactured as a sample and subjected to performance evaluation similarly to Example 1. The evaluation results are shown in Table 1.

Examples 2 to 5

Pneumatic tires each having a configuration similar to that of Example 1, except in that the specifications were changed as shown in Table 1, were manufactured as samples, which were subjected to performance evaluation similarly to Example 1. The evaluation results are shown in Table 1.

Drivability

The pneumatic tires thus manufactured were each mounted to a rim in size of MT5.50×17, which is assembled as a rear tire of a real vehicle of 600 cc displacement at a filling air pressure of 190 kPa. The vehicle was then repeatedly driven at 40 km/h to 250 km/h at a camber angle of 0° to 50° on a round track of 10 km, so as to evaluate drivability. Specifically, drivability was evaluated based on the feeling of a professional rider, which was indexed with a score of 100 representing the drivability of Comparative Example 1. A larger index value indicates that the tire is more excellent in drivability.

Partial Wear Resistance

The pneumatic tires thus manufactured were each mounted to a rim in size of MT5.50×17, which is assembled as a rear tire of a real vehicle of 600 cc displacement at a filling air pressure of 190 kPa. The vehicle was then repeatedly driven on a high-speed circuit at 40 km/h to 250 km/h for 10 km at a camber angle of 0° to 50°, so as to evaluate partial wear resistance based on the wear status of the grooves. Specifically, the state of the grooves was visually evaluated, which was indexed with a score of 100 representing the partial wear resistance of Comparative Example 1. A larger index value indicates that the tire is more excellent in partial wear resistance.

TABLE 1

|  | Comparative Example 1 | Example 1 | Example 2 | Example 3 | Example 4 | Example 5 |
| --- | --- | --- | --- | --- | --- | --- |
| Length of Oblique Side Portion [mm] | 54 | 54 | 54 | 54 | 54 | 54 |
| length of Second Groove Side [mm] | 250 | 250 | 250 | 250 | 250 | 250 |
| Inclination Angle α [°] | 54 | 54 | 54 | 54 | 54 | 54 |
| Intersection Angle β [°] | 35 | 35 | 35 | 35 | 35 | 35 |
| Groove Wall Angle γ1 [°] | 0 | 64 | 20 | 75 | 10 | 80 |
| Groove Wall Angle γ2 [°] | 0 | 72 | 20 | 75 | 10 | 80 |
| Drivability [-] | 100 | 105 | 101 | 103 | 100 | 102 |
| Partial Wear Resistance [-] | 100 | 115 | 105 | 116 | 102 | 117 |

It can be appreciated from Table 1 that the tires of Examples 1 to 5 have more excellent drivability and high partial wear resistance, as compared to the tire of Comparative Example 1.

INDUSTRIAL APPLICABILITY

The present invention can provide a pneumatic tire having both excellent drivability and a high partial wear resistance.

REFERENCE SIGNS LIST 1 tread surface
2 compound groove
3 first groove side
4 second groove side
5 first groove portion
6 second groove portion
31 first side portion
32 second side portion
33 oblique side portion

The invention claimed is:

1. A pneumatic tire comprising, in a tread surface, a compound groove partitioned into a first groove portion and a second groove portion by a first groove side and a second groove side, the first groove side having an oblique side portion diagonally disposed relative to a tire circumferential line in plan view, the second groove side intersecting with the oblique side portion of the first groove side at an acute angle in plan view,
wherein the first groove portion and the second groove portion both have a groove depth that gradually reduces in an extending direction of the groove toward an intersection between the oblique side portion and the second groove side, and a groove wall extending from the first groove side is formed as a tapered surface mildly-sloped toward a groove bottom on the intersection side when viewed in a groove transverse direction.

2. The pneumatic tire according to claim 1, wherein the oblique side portion is shorter in length than the second groove side.

3. The pneumatic tire according to claim 1, wherein the tapered surface form an angle with a plane perpendicular to the tread surface, the angle falling within a range of 20° to 75° measured from the acute-angle side.

4. The pneumatic tire according claim 1, wherein the oblique side portion forms an inclination angle relative to the tire circumferential line, the inclination angle falling within a range of 15° to 85° measured from the acute-angle side.

5. The pneumatic tire according to claim 1, wherein the first groove portion and the second groove portion both have a groove wall extending from the second groove side, the groove wall forming an angle with a plane perpendicular to the tread surface, which varies in an extending direction of the second groove side.

6. The pneumatic tire according to claim 1, wherein a groove wall extending from the second groove side is formed as a tapered surface mildly-sloped toward the groove bottom on the intersection side when viewed in a groove transverse direction, and the groove at the intersection side is formed only by the tapered surfaces of the groove sides.

* * * * *